United States Patent
Hoshi et al.

(10) Patent No.: US 9,239,018 B2
(45) Date of Patent: Jan. 19, 2016

(54) FUEL CONTROL APPARATUS FOR INTERNAL COMBUSTION ENGINE

(75) Inventors: Koichi Hoshi, Susono (JP); Takashi Watanabe, Gotemba (JP); Yusuke Nakayama, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 673 days.

(21) Appl. No.: 13/640,673

(22) PCT Filed: Jun. 16, 2010

(86) PCT No.: PCT/JP2010/060238
§ 371 (c)(1),
(2), (4) Date: Oct. 11, 2012

(87) PCT Pub. No.: WO2011/158353
PCT Pub. Date: Dec. 22, 2011

(65) Prior Publication Data
US 2013/0030671 A1 Jan. 31, 2013

(51) Int. Cl.
*F02D 19/06* (2006.01)
*F02D 41/12* (2006.01)
(Continued)

(52) U.S. Cl.
CPC ........ *F02D 19/0615* (2013.01); *F02D 19/0647* (2013.01); *F02D 41/0025* (2013.01); *F02D 41/0295* (2013.01); *F02D 41/126* (2013.01); *F01N 2900/1624* (2013.01); *F02D 19/0644* (2013.01); *F02D 19/0692* (2013.01); *F02D 19/084* (2013.01); *F02D 19/088* (2013.01);
(Continued)

(58) Field of Classification Search
CPC ............ F02D 19/0615; F02D 19/0647; F02D 19/0692; F02D 19/084; F02D 19/088; F02D 19/0644; F02D 41/0025; F02D 41/126; F02D 41/0027; F02D 41/0259; F02D 2200/0814; F01N 2900/1624; Y02T 10/36
See application file for complete search history.

(56) References Cited

U.S. PATENT DOCUMENTS 7,222,482 B2 * 5/2007 Yoshioka ................ F01N 3/101
60/276
2006/0101823 A1 5/2006 Takemoto et al.
(Continued)

FOREIGN PATENT DOCUMENTS

JP 2005-155401 A 6/2005
JP 2005-240656 A 9/2005
(Continued)

Primary Examiner — Hieu T Vo
Assistant Examiner — Sherman Manley
(74) Attorney, Agent, or Firm — Sughrue Mion, PLLC (57) ABSTRACT

A fuel control apparatus (100) for an internal combustion engine in a vehicle, the vehicle provided with: the internal combustion engine (200) provided with a fuel supply apparatus (208, 209) capable of supplying, as fuel, first fuel (liquid fuel) and second fuel (CNG) in which amount of a reducing agent in an exhaust air under an rich air-fuel ratio is greater than that in the first fuel; and an exhaust purification apparatus (300, 400) disposed in an exhaust passage of the internal combustion engine, the fuel control apparatus provided with: a first controlling device for controlling the fuel supply apparatus such that the supply of the fuel is temporarily stopped under a predetermined condition; and a second controlling device for controlling the fuel supply apparatus such that the second fuel is supplied as the fuel and such that an exhaust air-fuel ratio is the rich air-fuel ratio, if the supply of the fuel is restarted from a state in which the supply of the fuel is temporarily stopped.

5 Claims, 7 Drawing Sheets

(51) Int. Cl.
  *F02D 41/00* (2006.01)
  *F02D 41/02* (2006.01)
  *F02D 19/08* (2006.01)

(52) U.S. Cl.
  CPC ..... *F02D 41/0027* (2013.01); *F02D 2200/0814* (2013.01); *Y02T 10/36* (2013.01)

(56) References Cited

U.S. PATENT DOCUMENTS

| | | |
|---|---|---|
| 2008/0289599 A1 | 11/2008 | Kurotani et al. |
| 2009/0223206 A1* | 9/2009 | Peters ............... F01N 3/0835 60/285 |
| 2012/0324870 A1* | 12/2012 | Hoshi ............... F02D 19/0647 60/285 |
| 2015/0152793 A1* | 6/2015 | Matsuda ............... F02D 17/00 60/285 |

FOREIGN PATENT DOCUMENTS

| | | |
|---|---|---|
| JP | 2006-161804 A | 6/2006 |
| JP | 2008-223542 A | 9/2008 |
| JP | 2008-291716 A | 12/2008 |

\* cited by examiner

FUEL CONTROL APPARATUS FOR INTERNAL COMBUSTION ENGINE

CROSS REFERENCE TO RELATED APPLICATIONS

This application is a National Stage of International Application No. PCT/JP2010/060238, filed on Jun. 16, 2010, the contents of all of which are incorporated herein by reference in their entirety.

TECHNICAL FIELD

The present invention relates to a fuel control apparatus for an internal combustion engine, which controls a fuel supply state at the time of fuel cut control.

BACKGROUND ART

As this type of apparatus, an apparatus for performing air-fuel ratio rich control at the time of recovery from the fuel cut control has been suggested (e.g. refer to a patent document 1). According to the air-fuel ratio control apparatus for an internal combustion engine disclosed in the patent document 1, the air-fuel ratio rich control is stopped if standard amount of oxygen released, calculated on the basis of a target rich air-fuel ratio which is not influenced by a detected value of an exhaust air-fuel ratio sensor, is greater than or equal to an upper limit value of the amount of oxygen released. Thus, even if detection accuracy of the exhaust air-fuel ratio sensor is reduced and a detected exhaust air-fuel ratio is shifted to a lean side with respect to an actual exhaust air-fuel ratio, excessive continuation of the air-fuel rich control is considered to be suppressed.

Incidentally, there has been also suggested a control apparatus for a hydrogen engine which suppresses vibration and noise due to abnormal combustion of hydrogen by injecting gasoline before enriching an air-fuel ratio when the air-fuel ratio is enriched in order to release NOx in a bifuel engine which can use the hydrogen and the gasoline (e.g. refer to a patent document 2).

PRIOR ART DOCUMENT

Patent Document

Patent document 1: Japanese Patent Application Laid Open No. 2005-155401
Patent document 2: Japanese Patent Application Laid Open No. 2005-240656

DISCLOSURE OF INVENTION

Subject to be Solved by the Invention

In a period in which the fuel cut control is performed, an oxygen storage amount increases on an exhaust purification apparatus, such as a three-way catalyst, disposed in an exhaust passage of the internal combustion engine. Thus, the oxygen storage amount becomes greater than a suitable amount and a NOx reduction reaction hardly progresses.

The enrichment of the air-fuel ratio at the time of recovery from the fuel cut control aims at increasing amount of a reducing agent in an exhaust air in order to recover the oxygen storage amount to the suitable amount, and it is a required measure from the viewpoint of restoring a NOx purification ability of the exhaust purification apparatus as quickly as possible.

On the other hand, since the enrichment of the air-fuel ratio causes a relative increase in fuel consumption with respect to an intake air amount and deterioration of fuel efficiency, its implementation period is desirably short.

Here, the apparatus disclosed in the patent document 1 is considered to solve such problems that the detected value of the air-fuel ratio sensor is shifted to the lean side because the oxygen storage amount is separated from the suitable amount and that a period in which the air-fuel ratio is enriched is unnecessarily extended. Therefore, if there is a single type of fuel to be supplied, it can exert an effect to optimize the period in which the air-fuel ratio is enriched, to the minimum necessary.

However, a technology idea taking into account the use of the single type of fuel as described above does not always give the optimum solution to a so-called bifuel internal combustion engine or multi-fuel internal combustion engine capable of supplying a plurality of types of fuels. This is because different fuel types have different exhaust compositions, and the amount of the reducing agent in the exhaust air which promotes a reduction in the oxygen storage amount also changes inevitably.

In other words, the apparatus disclosed in the patent document 1 has such a technical problem that the deterioration of fuel efficiency is not necessarily sufficiently suppressed in enriching the air-fuel ratio at the time of recovery from the fuel cut control in the internal combustion engine capable of using the plurality of fuels.

Such a technical problem could occur in the same manner even on the apparatus disclosed in the patent document 2 based on the viewpoint of preventing vibration and noise.

In view of the aforementioned problems, it is therefore an object of the present invention to provide a fuel control apparatus for an internal combustion engine capable of preferably suppressing the deterioration of fuel efficiency in enriching the air-fuel ratio at the time of recovery from the fuel cut control in the internal combustion engine capable of using the plurality of fuels.

Means for Solving the Subject

The above object of the present invention can be achieved by a fuel control apparatus for an internal combustion engine in a vehicle, the vehicle provided with: the internal combustion engine provided with a fuel supply apparatus capable of supplying, as fuel, first fuel and second fuel in which amount of a reducing agent in an exhaust air under an rich air-fuel ratio is greater than that in the first fuel; and an exhaust purification apparatus disposed in an exhaust passage of the internal combustion engine, the fuel control apparatus provided with: a first controlling device for controlling the fuel supply apparatus such that the supply of the fuel is temporarily stopped under a predetermined condition; and a second controlling device for controlling the fuel supply apparatus such that the second fuel is supplied as the fuel and such that an exhaust air-fuel ratio is the rich air-fuel ratio, if the supply of the fuel is restarted from a state in which the supply of the fuel is temporarily stopped.

The vehicle of the present invention is provided with: the internal combustion engine; and the exhaust purification apparatus.

The internal combustion engine of the present invention is configured to use the first fuel and the second fuel. The second fuel is defined as fuel in which the amount of the reducing agent in the exhaust air under the rich air-fuel ratio is greater than that in the first fuel, where the rich air-fuel ratio broadly means an air-fuel ratio on a rich side (a fuel excess side) with respect to a stoichiometric air-fuel ratio (theoretical air-fuel ratio). As long as the definition is satisfied, the first fuel or the second fuel or both are not necessarily limited to a single type of fuel.

Incidentally, of course, the stoichiometric air-fuel ratio can vary depending on a fuel type. In view of this point, the expression of "the amount of the reducing agent in the exhaust air under the rich air-fuel ratio" means the amount of the reducing agent in a case where the first and second fuels have an equal air excess ratio or oxygen excess ratio, rather than the amount of the reducing agent in a case where the first and second fuels have an equal air-fuel ratio.

The first and second fuels are supplied by the fuel supply apparatus. The fuel supply apparatus is at least an apparatus capable of selectively supplying one of the first fuel and the second fuel as the fuel, and it is, as a preferred form, an apparatus capable of variably adjusting a supply ratio gradually or continuously. The fuel supply apparatus may be a fuel injection apparatus such as an electronically-controlled injector independently disposed for each of the first and second fuels, as a preferred form.

The exhaust purification apparatus is an apparatus at least including, as one portion of an exhaust purification process, oxidation of one portion of a purified material in the exhaust air and reduction of another portion. Preferably, the exhaust purification apparatus means various three-way catalytic apparatuses or the like capable of purifying the exhaust air by promoting an oxidization reaction of THC (Total Hydro Carbon), CO (carbon monoxide), and $H_2$ (hydrogen gas) as an oxidized material (i.e. the reducing agent) used for an oxidization process out of the purified material and a reduction reaction of NOx (nitrogen oxide) as a reduced material (i.e. an oxidizing agent) used for a reduction process out of the purified material in parallel to each other. Incidentally, a plurality of exhaust purification apparatuses may be disposed in the exhaust passage.

The fuel control apparatus for the internal combustion engine of the present invention is an apparatus capable of controlling a fuel supply state of the internal combustion engine in the vehicle provided with those constituents, and it can adopt forms of various computer systems or the like, such as microcomputer apparatuses, various controllers, or various processing units like a single or a plurality of electronic controlled units (ECUs), which can include, as occasion demands, one or a plurality of central processing units (CPUs), micro processing units (MPUs), various processors or various controllers, or further, various storage devices or the like, such as a read only memory (ROM), a random access memory (RAM), a buffer memory or a flash memory.

According to the fuel control apparatus for the internal combustion engine of the present invention, the supply of the fuel is temporarily stopped under the predetermined condition by the first controlling device. Incidentally, hereinafter, this type of measure to temporarily stop the supply of the fuel while the vehicle is moving will be referred to as "fuel cut control" or the like, as occasion demands. The fuel cut control is a measure to reduce amount of fuel consumption, which can be performed, for example, at the time of coast down driving accompanied by an OFF operation of an accelerator pedal and in a case where an engine rotational speed of the internal combustion engine is greater than or equal to a reference value or in similar cases.

Incidentally, the fuel supplied at a time point at which the fuel cut control is started may be either the first fuel or the second fuel, or may be fuel obtained by mixing the first and second fuels as occasion demands. In any case, by temporarily stopping the supply, the amount of fuel consumption can be reduced in accordance with the stop period.

On the one hand, in the period in which the fuel cut control is performed, the exhaust purification apparatus is exposed to an oxygen-rich (i.e. air-fuel ratio lean) atmosphere in comparison with a period in which the fuel cut control is not performed. Therefore, in the period in which the fuel cut control is performed, the oxygen storage amount of the exhaust purification apparatus increases.

On the other hand, in the condition that the oxygen storage amount increases as described above, a reduction action of the reduced material (e.g. NOx in the case of the three-way catalytic apparatus) does not fully progress. Thus, if no measures are taken, the reduced material is possibly released to a space outside the vehicle while the purification remains insufficient in a reasonable period of time from a time point at which the supply of the fuel is restarted. Incidentally, hereinafter, the restart of the supply of the fuel after the end of the fuel cut control will be referred to as "recovery from the fuel cut control" or the like, as occasion demands.

According to the fuel control apparatus for the internal combustion engine of the present invention, in order to suppress the release of the reduced material to the outside of the vehicle as described above, the second controlling device takes a measure to control the fuel supply apparatus such that the exhaust-air fuel ratio is the rich air-fuel ratio (hereinafter referred to as "air-fuel ratio enrichment control", as occasion demands) at the time of recovery from the fuel cut control.

Incidentally, the recovery from the fuel cut control can include, for example, both of forcible recovery associated with an accelerator operation by a driver or the like and spontaneous recovery associated with a reduction in the engine rotational speed of the internal combustion engine. Moreover, the rich air-fuel ratio associated with the air-fuel ratio enrichment control is an air-fuel ratio which is greater than or equal to a flammability limit air-fuel ratio, and desirably, it is a fixed or variable air-fuel ratio set on the basis of experiments, experiences, theories, simulations or the like in advance such that a balance can be achieved between an emission-suppressing effect and an effect of suppression of deterioration of fuel efficiency described later.

Incidentally, as a case where the rich air-fuel ratio is variable, for example, a combustion state of the internal combustion engine at the time of recovery from the fuel cut control may be detected, as occasion demands, and the rich air-fuel ratio may be adjusted, as occasion demands, with the stoichiometric air-fuel ratio as an upper limit such that combustion deterioration is not actualized (e.g. such that a misfire rate is less than a predetermined value).

If the air-fuel ratio enrichment control is performed, the content of the reducing agent in the exhaust air increases. Thus, the consumption of oxygen stored beyond an appropriate range in the exhaust purification apparatus is promoted, and the oxygen storage amount of the exhaust purification apparatus starts to decrease. As a result, the oxygen storage amount of the exhaust purification apparatus converges within the appropriate range earlier than in a case where the air-fuel enrichment control is not performed. Thus, it is possible to restore an original exhaust purification ability of the exhaust purification apparatus.

Here, the second controlling device of the present invention uses the second fuel as the fuel used for the air-fuel ratio enrichment control. The second fuel is, as described above, the fuel in which the amount of the reducing agent in the exhaust air under the rich air-fuel ratio is greater than that in the first fuel. Therefore, it is possible to make the oxygen storage amount of the exhaust purification apparatus converge within the appropriate range earlier, and it is possible to reduce a period in which the air-fuel ratio enrichment control is performed, in comparison with a case where the first fuel is used.

The air-fuel ratio enrichment control is qualitatively a measure to excessively supply the fuel. Thus, its long or short implementation period is directly linked to high or low fuel efficiency, respectively. In other words, by performing the air-fuel ratio enrichment control using the second fuel, it is possible to suppress the fuel consumption at the time of recovery from the fuel cut control as much as possible, thereby to preferably suppress the deterioration of fuel efficiency.

Further to that, in an internal combustion engine using a single type of fuel and an internal combustion engine capable of using a plurality of types of fuels like the internal combustion engine of the present invention, measures taken to suppress the deterioration of fuel efficiency due to the air-fuel ratio enrichment control (i.e. the deterioration of fuel efficiency with respect to the stoichiometric air-fuel ratio caused by setting the air-fuel ratio on the rich side) can be totally different in their concept. In other words, in the former, there is no difference in the amount of the reducing amount in the exhaust air between the two fuels. Thus, in the first place, there is no sign or path leading to a technical idea indicating the selection of appropriate fuel which can reduce the oxygen storage amount as early as possible at the time of recovery from the fuel cut control.

More specifically, in the former, increasing the reducing agent in the exhaust air and increasing a fuel amount are equivalent in meaning. Therefore, even if the increased amount of the reducing agent reduces a time until the oxygen storage amount converges within the appropriate range (hereinafter referred to a "convergence time" as occasion demands), there is no influence on the total amount of fuel consumption, and an effect associated with an improvement of fuel efficiency is not obtained at all. After all, there is no choice but to take a measure, such as accurately detecting that the oxygen storage amount of the exhaust purification apparatus converges within the appropriate range, as a realistic measure.

On the other hand, in the case of the internal combustion engine capable of using the plurality of types of fuels, even if each of the fuels has an equal amount of the fuel consumed per unit time, depending on the fuel type, it is possible to change the convergence time by an amount in which a content ratio of the reducing agent (in one fuel) is greater (than that in the other fuel). Alternatively, even in the same convergence time, depending on the fuel type, it is possible to change the amount of the fuel consumed to make the oxygen storage amount converge within the appropriate range. Therefore, the deterioration of fuel efficiency which can be caused at the time of recovery from the fuel cut control can be suppressed from a fundamental viewpoint.

In one aspect of the fuel control apparatus for the internal combustion engine of the present invention, the fuel control apparatus is provided with a first specifying device for specifying an oxygen storage amount of the exhaust purification apparatus in a period in which the supply of the fuel is temporarily stopped, and the second controlling device controls the exhaust air-fuel ratio to be maintained at the rich air-fuel ratio until the specified oxygen storage amount becomes less than a reference value.

According to this aspect, the air-fuel ratio enrichment control is continued until the oxygen storage amount of the exhaust purification apparatus specified by the first specifying device becomes less than the reference value. Therefore, it is also possible to obtain the effect of the suppression of the deterioration of fuel efficiency by optimizing the period in which the air-fuel ratio enrichment control is performed, in addition to the effect of the suppression of the deterioration of fuel efficiency obtained by using the second fuel.

Incidentally, the "reference value" means a value in which a reduction ability of the oxidized material of the exhaust purification apparatus can be considered to be fully restored and which is set, for example, on the basis of experiments, experiences, theories, simulations or the like in advance. As a preferred form, the reference value may be a value for defining an upper limit of the appropriate range described above.

Moreover, the term "specify" means that no limitation is provided for the process, and it can in effect adopt various practical aspects such as detect, calculate, estimate, select, or obtain.

In another aspect of the fuel control apparatus for the internal combustion engine of the present invention, the first fuel has higher combustibility than that of the second fuel, the fuel control apparatus for the internal combustion engine is further provided with a second specifying device for specifying a combustion condition of the fuel in a period in which the exhaust air-fuel ratio is set to be the rich air-fuel ratio by the second controlling device, and the second controlling device increases a ratio of the first fuel in the supplied fuel if the specified combustion condition corresponds to a predetermined combustion-deteriorating condition.

In this aspect, the first fuel is defined as the fuel having higher combustibility than that of the second fuel.

Here, "higher combustibility" means that it hardly causes the combustion deterioration (e.g. a misfire, a reduction in combustion pressure, a reduction in combustion efficiency, etc.). This difference in combustibility can be caused by, for example, characteristics of the fuel, a fuel storage aspect, a supply aspect, or the like. For example, if one fuel is liquid fuel and the other fuel is gaseous fuel, an air-fuel mixture has poorer homogeneity when the latter is mixed with the air. In this case, it can be said that the liquid fuel has higher combustibility. Moreover, if an ignition temperature of the one fuel is lower than that of the other fuel, the latter is ignited more easily and the combustion thereof tends to be more stable. In this case, it can be said that the fuel having the lower ignition temperature has higher combustibility.

If the first fuel is the fuel having higher combustibility than that of the second fuel, the first fuel is desirably used at the time of recovery from the fuel cut control from the viewpoint of preventing various combustion deteriorations such as occurrence of the misfire, a reduction in combustion pressure, or a reduction in combustion efficiency.

On the other hand, such a difference in combustibility of the fuel is hardly actualized if the combustion condition of the fuel is good in the internal combustion engine. In this case, in contrast, it can be more advantageous to use the second fuel to obtain the effect associated with the suppression of the deterioration of fuel efficiency.

According to this aspect, if the combustion condition of the fuel specified by the second specifying device corresponds to the combustion-deteriorating condition defined as a condition which might cause this type of combustion deterioration or resultant problems (e.g. an engine stall, a torque variation, a reduction in drivability, etc.), the second controlling device increases the ratio of the first fuel in the fuel used in performing the air-fuel ratio enrichment control.

Therefore, the deterioration of fuel efficiency at the time of recovery from the fuel cut control can be suppressed without actualizing the problems due to the combustion deterioration of the internal combustion engine, which is useful in operation of the internal combustion engine.

Incidentally, the measure associated with the second controlling device also includes that one portion of the supplied fuel is replaced by the first fuel, in a case where only the second fuel is supplied basically in performing the air-fuel ratio enrichment control. Moreover, it also includes that the entire supplied fuel is replaced by the first fuel.

Incidentally, the "combustion condition of the fuel" specified by the second specifying device means an operating condition and a state of the internal combustion engine which are determined in advance to correspond to the degree of the combustion deterioration in a one-to-one, one-to-many, many-to-one, or many-to-many manner, and practically means a physical quantity, a controlled variable, an index value, or the like for defining the operating condition and state. For example, the combustion condition of the fuel may be various load conditions of the internal combustion engine indicated by a load factor, an intake air amount, or the like, an environmental condition indicated by an outside air temperature or the like, or a warm-up state of the internal combustion engine indicated by a coolant temperature or the like.

Incidentally, the combustion-deteriorating condition is practically defined by various reference values which can be compared with the physical quantity, the controlled variable, or the index value for defining the combustion condition. For example, the combustion-deteriorating condition means a case where the load factor is less than an appropriate reference value, or similar cases.

In one aspect of the fuel control apparatus for the internal combustion engine of the present invention in which there is provided the second specifying device, the second controlling device forbids using the second fuel if the specified combustion condition corresponds to the combustion-deteriorating condition.

According to this aspect, since the use of the second fuel is forbidden if the specified combustion condition corresponds to the combustion-deteriorating condition, a reduction in power performance, occurrence of vibration, or deterioration of emission, which is caused by a misfire, a reduction in combustion efficiency, a reduction in combustion pressure or the like, is prevented certainly.

Incidentally, if the use of the second fuel is forbidden, a practical benefit specific to the present invention indicating prevention of the deterioration of fuel efficiency at the time of recovery from the fuel cut control is not obtained; however, since the combustion condition at the time of recovery from the fuel cut control does not always correspond to the combustion-deteriorating condition, the effect associated with the suppression of the deterioration of fuel efficiency is sufficiently ensured on the whole.

In another aspect of the fuel control apparatus for the internal combustion engine of the present invention in which there is provided the second specifying device, the second controlling device controls the first fuel to be supplied in synchronization with an intake stroke of the internal combustion engine if the first fuel is liquid fuel and if the fuel supply apparatus supplies the first fuel to an intake passage of the internal combustion engine.

If the liquid fuel is supplied to the intake passage, basically, the fuel is supplied in an exhaust stroke in which an intake valve is still in a valve closed state in many cases. This is a preferable measure in that there is a meaning of premixing the liquid fuel with an intake air in the intake passage and a meaning of obtaining an atomization-promoting effect at the time of valve opening of the intake valve.

On the other hand, conversely speaking, if the fuel is supplied in timing synchronized with the intake stroke, the fuel and the air tend to be insufficiently mixed because the atomization-promoting effect of the fuel is not obtained at the time of valve opening of the intake valve, and the ratio of unburned materials (THC, CO, $H_2$, etc.) blowing through the exhaust passage in the supplied fuel increases.

According to this aspect, it is possible to increase the reducing agent supplied to the exhaust passage, with the stability of the combustion ensured, by using a reduction in homogeneity of the air-fuel mixture due to an intake stroke synchronous injection. Therefore, for the same reason as in the case where the second fuel is used, it is possible to reduce the aforementioned convergence time required for the oxygen storage amount of the exhaust purification apparatus to converge within the appropriate range, and it is possible to obtain a certain effect in the suppression of the deterioration of fuel efficiency even in the restriction that the first fuel is to be used at least partially.

In another aspect of the fuel control apparatus for the internal combustion engine of the present invention, the first fuel is liquid fuel and the second fuel is CNG.

According to this aspect, the first fuel is the liquid fuel including gasoline, alcohol, blended fuel thereof, or the like, and the second fuel is compressed natural gas (CNG) as gaseous fuel. Therefore, by changing the fuel type, as occasion demands, in accordance with the operating condition of the internal combustion engine, it is possible to achieve a balance between power performance and environmental performance. Here, in the CNG, the amount of the reducing agent in the exhaust air under the rich air-fuel ratio is greater than that in the gasoline, the alcohol, and the blended fuel thereof, and thus, the CNG is preferable as the second fuel capable of suppressing the deterioration of fuel efficiency at the time of recovery from the fuel cut control.

Moreover, the CNG is more effective in emission reduction in a cold condition in comparison with this type of liquid fuel. Therefore, taking a measure, such as positively using the CNG in the cold condition or using the CNG as main fuel except a partial condition, can be a practically useful fuel supply aspect.

The operation and other advantages of the present invention will become more apparent from the embodiments explained below.

MODE FOR CARRYING OUT THE INVENTION

Embodiments of the Invention

Hereinafter, various preferred embodiments of the present invention will be explained with reference to the drawings.

First Embodiment

Configuration of Embodiment

Figure 1:
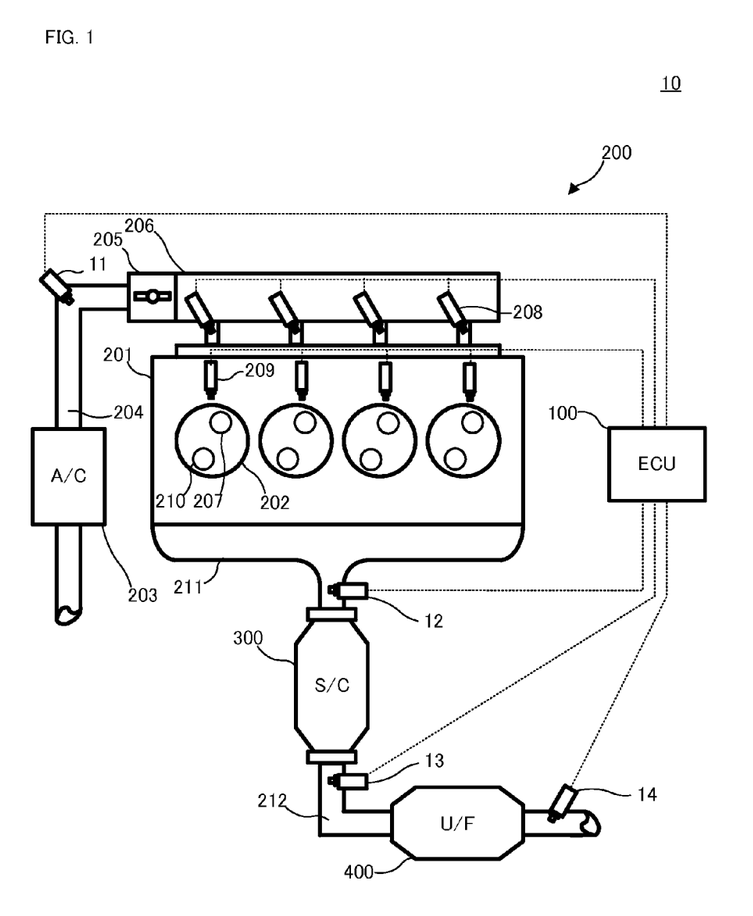
FIG. 1 is a schematic configuration diagram conceptually showing a configuration of an engine system in a first embodiment of the present invention.

Firstly, a configuration of an engine system 10 in a first embodiment of the present invention will be explained. FIG. 1 is a schematic configuration diagram conceptually showing the configuration of the engine system 10.

In FIG. 1, the engine system 10 is installed in a not-illustrated vehicle, and it is provided with: an ECU 100; an engine 200; and a S/C catalyst 300; and a U/F catalyst 400.

The ECU 100 is provided with a central processing unit (CPU), a read only memory (ROM), and a random access memory (RAM) or the like, and it is an electronic control unit capable of controlling all the operations of the engine 200. The ECU 100 is one example of the "fuel control apparatus for the internal combustion engine" of the present invention. The ECU 100 is configured to perform F/C control and F/C recovery control described later, in accordance with a control program stored in the ROM.

Incidentally, the ECU 100 is a unified electronic control unit configured to function as one example of each of the "first controlling device", the "second controlling device", and the "first specifying device" of the present invention, and all the operations of each of the devices are performed by the ECU 100. However, the physical, mechanical, and electrical configurations of each of the devices of the present invention are not limited to this example, and for example, each of the devices may be configured as various computer systems or the like such as a plurality of ECUs, various processing units, various controllers, or microcomputer apparatuses.

The engine 200 is a four-cylinder engine as one example of the "internal combustion engine" of the present invention.

An outline of the engine 200 will be explained. The engine 200 has such a configuration that four cylinders 202 are arranged in a cylinder block 201. An air-fuel mixture including fuel, which is compressed in each cylinder in a compression stroke, is ignited and burned by an ignition operation by a not-illustrated ignition apparatus. A force generated in the combustion reciprocates a not-illustrated piston in a direction perpendicular to the plane of FIG. 1 and is further converted to a rotary motion of a crankshaft coupled with the piston via a connecting rod (where the crankshaft and the connecting rods are not illustrated).

Hereinafter, a main part configuration of the engine 200 will be explained with one portion of its operations. Incidentally, the engine 200 in the embodiment is an in-line four-cylinder engine in which the four cylinders 202 are arranged in parallel in the direction perpendicular to the plane of FIG. 1; however, configurations of the individual cylinders 202 are equal to one another. Thus, only one cylinder 202 will be explained here.

An intake air sucked from the exterior via an air cleaner 203 is supplied to an intake passage 204. In the intake passage 204, there is disposed a throttle valve 205 capable of adjusting an amount of the intake air. The throttle valve 205 is provided with a rotary valve configured to be rotated by a driving force supplied from a throttle valve motor (not illustrated) which is electrically connected to the ECU 100 and which is controlled by the ECU 100. The rotational position of the throttle valve 205 is continuously controlled from a fully closed position at which a communication between an upstream portion and a downstream portion of the intake passage 204 determined by the throttle valve 205 as the boundary is cut or blocked, to a fully opened position at which the upstream portion and the downstream portion are fully communicated The intake passage 204 is connected to a surge tank 206 on the downstream side of the throttle valve 205 and is communicated in the inside of the intake passage 204. The surge tank 206 is connected to communicating tubes (whose reference numerals are omitted) communicated with intake ports (not illustrated) corresponding to the respective cylinders formed in the cylinder block 201. Each of the intake ports is communicated with the inside of respective one of the cylinders at the time of valve opening of an intake valve 207.

In each communicating tube corresponding to respective one of the cylinders, a fuel injection valve of a CNG injector 208 is exposed, and CNG as fuel is injected from the fuel injection valve. The CNG injector 208 is an electronically-controlled fuel injection apparatus as one example of the "fuel supply apparatus" of the present invention, which is electrically connected to the ECU 100, and an injection amount of the CNG on the CNG injector 208 is controlled by the ECU 100. Incidentally, the CNG is stored in a not-illustrated storage tank in a gaseous state, and the CNG is one example of the "second fuel" and the "gaseous fuel" of the present invention.

In each communicating tube corresponding to respective one of the cylinders, a fuel injection valve of a liquid fuel injector 209 is exposed. The liquid fuel injector 209 is an electronically-controlled fuel injection apparatus as one example of the "fuel supply apparatus" of the present invention, which can atomize and inject liquid fuel as one fuel of the engine 200, to the inside of the intake port.

Here, the liquid fuel in the embodiment is configured as gasoline-ethanol blended fuel. An ethanol content ratio of the liquid fuel varies from 0% (E0 fuel) to 100% (E100 fuel). A liquid fuel tank for storing the liquid fuel has an alcohol concentration sensor attached thereto, which can detect an ethanol concentration, and is configured to detect the ethanol concentration of the liquid fuel at that time point. Moreover, the alcohol concentration sensor is electrically connected to the ECU 100, and the detected ethanol concentration is referred to by the ECU 100, as occasion demands. Incidentally, the liquid fuel is one example of the "first fuel" and the "liquid fuel" of the present invention.

As described above, the engine 200 has the degree of freedom in a gasoline-ethanol blend ratio and is configured as one example of a so-called flexible fuel (FF) engine. Moreover, the engine 200 constitutes one example of a so-called bifuel engine, which can use the CNG and the liquid fuel as fuel.

Incidentally, in the embodiment, the gasoline-ethanol blended fuel is adopted as the "first fuel" and the "liquid fuel" of the present invention; however, this is merely one example, and a single fuel of gasoline or ethanol may be adopted as the liquid fuel.

A burned gas after a combustion stroke in each cylinder (which merely means that the gas passes through the combustion stroke and does not define whether or not the gas is fully burned) is emitted to an exhaust manifold 211 via an exhaust valve 210 in an exhaust stroke. To the exhaust manifold 211, an exhaust passage 212 as one example of the "exhaust passage" of the present invention is connected, and the burned gas flows to the downstream side in the exhaust passage 212 as an exhaust air.

In the exhaust passage 212, a start converter (S/C) catalyst 300 is disposed. The S/C catalyst 300 is a three-way catalyst device for carrying noble metal, such as platinum and rhodium, on a catalyst carrier formed of a ceramic material or a metal material or the like. The S/C catalyst 300 is one example of the "exhaust purification apparatus" of the present invention, configured to purify NOx, CO, and HC in parallel, by reducing NOx in the exhaust air supplied to the exhaust passage 212 via the exhaust manifold 211 by a reduction treatment and by oxidizing CO and HC in the exhaust air with oxygen obtained by the reduction treatment.

On the downstream side of the S/C catalyst 300 in the exhaust passage 212, an under floor (U/F) catalyst 400 is disposed. The U/F catalyst 400 is a three-way catalyst device for carrying noble metal, such as platinum and rhodium, on a catalyst carrier formed of a ceramic material or a metal material or the like. The U/F catalyst 400 is another example of the "exhaust purification apparatus" of the present invention, configured to purify NOx, CO, and HC in parallel, by reducing NOx in the exhaust air supplied to the exhaust passage 212 via the exhaust manifold 211 by a reduction treatment and by oxidizing CO and HC in the exhaust air with oxygen obtained by the reduction treatment. Incidentally, both of the U/F catalyst 400 and the S/C catalyst 300 are the three-way catalyst devices but not necessarily have the same configurations; for example, they may have different distribution ratios and amounts of the noble metal.

The engine system 10 is provided with: an airflow sensor 11; an air-fuel ratio sensor 12; a first $O_2$ sensor 13; and a second $O_2$ sensor 14.

The airflow sensor 11 is a sensor which is configured to detect an intake air amount Ga as the amount of the intake air in the intake passage 204. The airflow sensor 11 is electrically connected to the ECU 100, and the detected intake air amount Ga is referred to by the ECU 100, as occasion demands.

The air-fuel ratio sensor 12 is a sensor which is disposed near a connection portion to the exhaust manifold 211 in the exhaust passage 212 and which is configured to detect an exhaust air-fuel ratio AF. The air-fuel ratio sensor 12 is electrically connected to the ECU 100, and the detected exhaust air-fuel ratio AF is referred to by the ECU 100, as occasion demands.

The first $O_2$ sensor 13 is a linear $O_2$ sensor which is disposed near an exit of the S/C catalyst 300 in the exhaust passage 212 (on the upstream side of the U/F catalyst 400) and which outputs a pre-sensor output voltage Vox1 according to an oxygen concentration in the disposition site. The pre-sensor output voltage Vox1 becomes higher as an atmosphere around the sensor approaches an oxygen-deficient, rich atmosphere, and the pre-sensor output voltage Vox1 becomes lower as the atmosphere around the sensor approaches an oxygen-excessive, lean atmosphere.

The second $O_2$ sensor 14 is a linear $O_2$ sensor which is disposed near an exit of the U/F catalyst 400 in the exhaust passage and which outputs a post-sensor output voltage Vox2 according to an oxygen concentration in the disposition site. The post-sensor output voltage Vox2 becomes higher as an atmosphere around the sensor approaches an oxygen-deficient, rich atmosphere, and the post-sensor output voltage Vox2 becomes lower as the atmosphere around the sensor approaches an oxygen-excessive, lean atmosphere.

Incidentally, apart from those sensors, various sensors can be provided for the engine system 10; however, the details thereof will be omitted to prevent complicated drawings. For example, the engine system 10 is provided with: a vehicle speed sensor for detecting a vehicle speed V; a rotational speed sensor for detecting an engine rotational speed Ne of the engine 200; an accelerator opening sensor for detecting an accelerator opening degree Ta of the vehicle; a coolant temperature sensor for detecting a coolant temperature Tw of the engine 200; and the like.

Operations of Embodiment

Details of F/C Control

Figure 2:
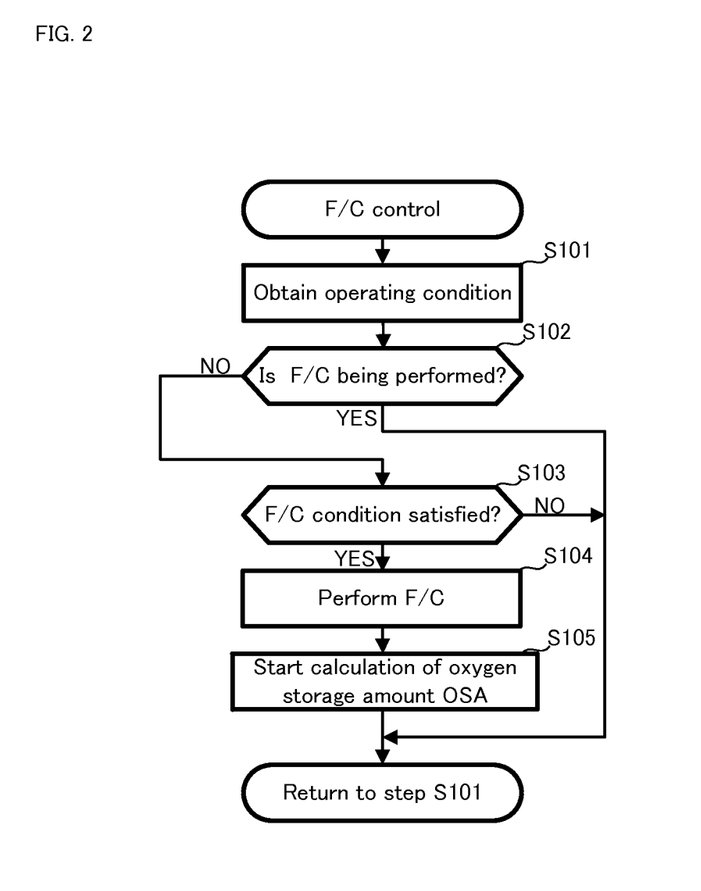
FIG. 2 is a flowchart showing F/C control performed by the engine system in FIG. 1.

Firstly, with reference to FIG. 2, the details of the F/C control performed by the ECU 100 will be explained. FIG. 2 is a flowchart showing the F/C control.

In FIG. 2, the ECU 100 obtains an operating condition of the vehicle and the engine 200 (step S101).

The operating condition obtained in the step S101 is an operating condition associated with a fuel supply aspect, such as selection of a fuel type, necessity and advisability of fuel cut (hereinafter abbreviated as "F/C" as occasion demands), and a fuel injection amount and injection timing. More specifically, the ECU 100 obtains the accelerator opening degree Ta, the coolant temperature Tw, the vehicle speed V, the engine rotational speed Ne, the intake air amount Ga, the exhaust air-fuel ratio AF, the pre-sensor output voltage Vox1, the post-sensor output voltage Vox2, and the like.

If obtaining the various operating conditions, the ECU 100 judges whether or not the F/C is being performed (step S102). If the F/C is being performed at that time point (the step S102: YES), the ECU 100 returns this process to the step S101.

On the other hand, if the F/C is not performed (the step S102: NO), the ECU 100 judges whether or not a F/C condition is satisfied on the basis of the operating condition obtained in the step S101 (step S103).

Here, the F/C condition is a condition determined to perform the F/C in advance, and in the embodiment, the F/C condition is defined as that the engine rotational speed Ne is greater than or equal to a reference value, that the vehicle speed V is greater than or equal to a reference value, and that the accelerator opening degree is an off corresponding value. In other words, qualitatively, the F/C is performed to suppress fuel consumption at the time of coast down driving in a middle-to-high vehicle speed area. Incidentally, the F/C condition is one example of the "predetermined condition" of the present invention and is not limited to the condition exemplified here.

If the F/C is not performed and if the F/C condition is not satisfied (the step S103: NO), i.e. if there is no request to perform the F/C, the ECU 100 returns the process to the step S101.

Incidentally, if there is no request to perform the F/C in a period in which the F/C is not performed as described above, normal fuel injection control is performed.

The normal fuel injection control will be explained briefly. The ECU 100 judges whether or not the operating condition of the vehicle (e.g. which may be obtained in the step S101) corresponds to a liquid fuel supply condition. In the embodiment, either the liquid fuel or the CNG is selectively used as fuel. Therefore, a case where the operating condition corresponds to the liquid fuel supply condition is equivalent to a case where the operating condition does not correspond to a CNG supply condition.

Incidentally, the CNG has less emission than the liquid fuel in a cold condition, and it is preferable as supplied fuel in the cold condition before the S/C catalyst 300 and the U/F catalyst 400 reach their catalytic activity temperatures. In view of this point, the engine 200 may be supplied with the CNG as fuel, for example, in the cold condition in which the coolant temperature Tw is less than a reference value. In this case, the liquid fuel supply condition may be that the coolant temperature Tw is greater than or equal to the reference value.

If the operating condition corresponds to the liquid fuel supply condition, the ECU 100 performs liquid fuel injection control. On the other hand, if the obtained operating condition corresponds to the CNG supply condition, the ECU 100 performs CNG injection control.

Incidentally, the liquid fuel and CNG supply conditions are appropriately set in accordance with specifications, destinations, required performances and the like of the vehicle and the engine system 10, and the aspect exemplified here is merely one example.

In particular, the liquid fuel in the embodiment is the gasoline-ethanol blended fuel including the E0 fuel containing 100% of gasoline and the E100 fuel containing 100% of ethanol, and its burning characteristics and emission amount can significantly change in accordance with the ethanol concentration. In view of this point, a fuel selection criterion may be changed, as occasion demands, in accordance with the ethanol concentration in the liquid fuel at that time point. Moreover, as described above, the CNG is the gaseous fuel and has poorer volumetric efficiency than the liquid fuel. Plainly speaking, the CNG has a less storage amount on a mass basis in comparison with the liquid fuel. In view of this point, a measure may be taken from the viewpoint of efficiently using the CNG, such as allowing the CNG to be supplied only under the circumstances that the CNG is remarkably superior to the liquid fuel.

On the other hand, if the F/C condition is satisfied in the period in which the F/C is not performed (the step S103: YES), i.e. if there is a request to perform the F/C, the ECU 100 performs the F/C (step S104).

More specifically, the ECU 100 controls one of the CNG injector 208 and the liquid fuel injector 209 corresponding to the fuel selected as fuel used at that time point such that the supply of the fuel is stopped. Incidentally, the operation in the step S104 is one example of the operations of the "first controlling device" of the present invention.

If the F/C is performed, the ECU 100 starts calculation of an oxygen storage amount OSA of the S/C catalyst 300 (step S105). Here, the oxygen storage amount OSA is calculated by the following equation (1). Incidentally, once started, the calculation of the oxygen storage amount OSA is continuously performed until the end of enrichment of A/F in the F/C recovery control described later.

$$OSA = \Sigma (0.23 \times mfr \times (AFst - AF)) \times \Delta t \quad (1)$$

In the above equation (1), "0.23" is a weight ratio of oxygen contained in the air, mfr is a fuel injection amount per unit time, and AFst is a stoichiometric air-fuel ratio of fuel used at a time point of ending the injection. AFst is approximately 14.7 if the fuel used at the time point of ending the injection is gasoline (E0 fuel).

If the calculation of the oxygen storage amount OSA is started, the process is returned to the step S101. The F/C control is performed as described above.

<Details of F/C Recovery Control>

Figure 3:
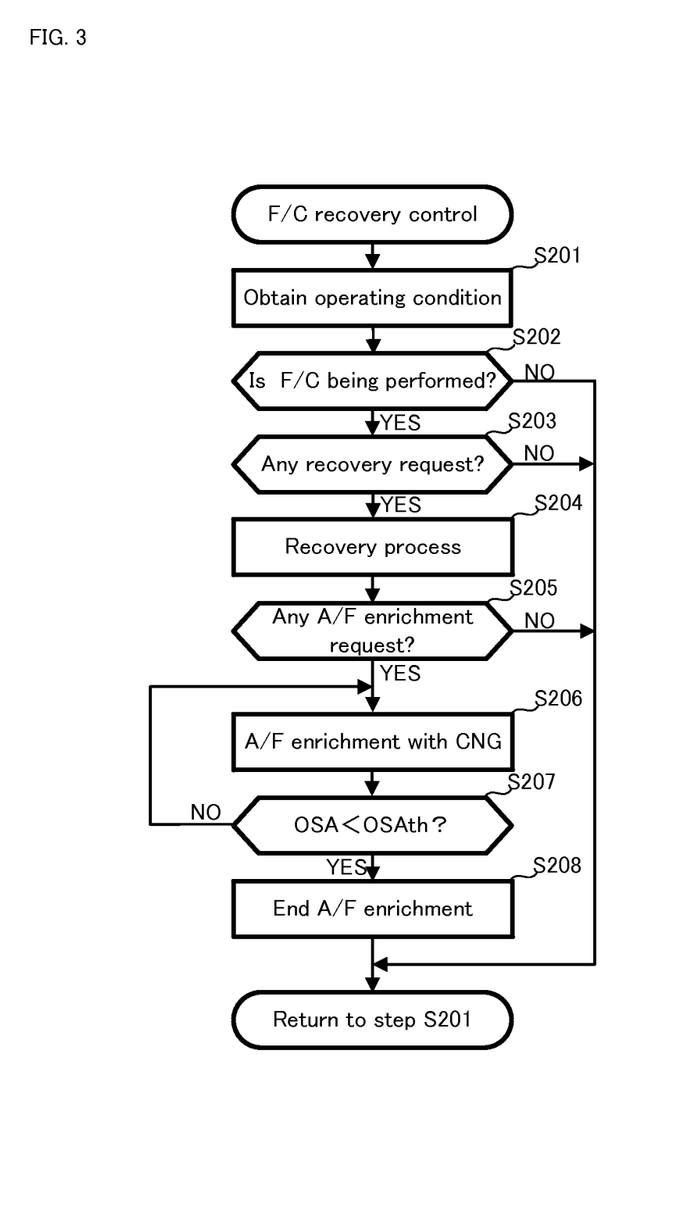
FIG. 3 is a flowchart showing F/C recovery control performed by the engine system in FIG. 1.

Next, with reference to FIG. 3, the details of the F/C recovery control will be explained. FIG. 3 is a flowchart showing the F/C recovery control.

In FIG. 3, the ECU 100 obtains an operating condition as in the step S101 in the F/C control (step S201) and judges whether or not the F/C is being performed as in the step S102 in the F/C control (step S202). If the F/C is not being performed (the step S202: NO), the ECU 100 returns this process to the step S201.

If the F/C is being performed (the step S202: YES), the ECU 100 judges whether or not there is a recovery request to recover from the F/C (step S203). The recovery request means a request to restart the supply of the fuel. If there is no recovery request to recover from the F/C (the step S203: NO), i.e. in a situation in which the F/C is to be continued, the process is returned to the step S201. In this case, since the step S102 in the F/C control described above is "YES", the F/C is continued.

Incidentally, there are two types of recovery requests to recover from the F/C; one occurs artificially, and the other spontaneously arises in the course of coast down driving. The former one corresponds, for example, to a case where a drive request is made or similar cases for the reason that an accelerator pedal is pressed or for similar reasons, namely meaning a request to end the coast down driving. The latter one corresponds, for example, to a case where the start of the engine 200 is requested even during the coast down driving or similar cases for the reason that the engine rotational speed Ne approaches a lower limit rotational speed at which the engine is self-sustainable or for similar reasons.

Incidentally, the presence or absence of the recovery request can be replaced by whether or not a F/C condition is satisfied, as in the step S103 in the F/C control. In other words, in this case, it may be judged that there is the recovery request to recover from the F/C if the F/C is being performed and if the F/C condition is not satisfied.

If there is the recovery request due to a change in the operating condition of the engine 200 or the vehicle during execution of the F/C or the like (the step S203: YES), the ECU 100 performs a recovery process (step S204). The recovery process in the step S204 means that the F/C is stopped and the supply of the fuel is restarted. The fuel at this time may be fuel according to the normal fuel supply control described above. If the recovery process is started, the F/C is ended.

If the recovery process is performed, the ECU 100 further judges whether or not there is an A/F enrichment request (step S205). The A/F enrichment request means a request to implement a measure indicating that the exhaust air-fuel ratio AF is maintained at a rich air-fuel ratio AFr set on the richer side than the stoichiometric air-fuel ratio through an experimental adjustment in advance (hereinafter abbreviated as "A/F enrichment" as occasion demands).

Further to that, if the oxygen storage amount of the S/C catalyst 300 is beyond an appropriate range determined under the assumption that the S/C catalyst 300 can exert a purification ability of the catalyst expected in advance, a reduction reaction of NOx as an oxidizing agent does not fully progress. Thus, in a type of transitional period until the oxygen storage amount OSA falls within the appropriate range after a start time point of the recovery process, NOx is easily released out of the vehicle without sufficiently purified. In other words, if there is the recovery request to recover from the F/C, it is necessary to promptly restore the NOx purification ability of the S/C catalyst 300.

If the A/F enrichment is performed, the exhaust air of the engine 200 contains more unburned materials such as HC, CO, and $H_2$ than those under the stoichiometric air-fuel ratio. The unburned materials function as a reducing agent in the catalytic reaction on the S/C catalyst 300 and reacts and burns with oxygen stored beyond the appropriate range in the catalyst due to the execution of the F/C, thereby accelerating the fall or reduction in the oxygen storage amount OSA of the S/C catalyst 300.

Incidentally, since the enrichment of the air-fuel ratio causes an oxygen deficient atmosphere in the cylinder, the amount of NOx generated is reduced in comparison with that under the stoichiometric air-fuel ratio. Therefore, in a period in which the air-fuel ratio is maintained at the rich air-fuel ratio, deterioration of emission due to NOx does not progress.

In the step S205, the ECU 100 judges that there is the A/F enrichment request if the oxygen storage amount OSA of the S/C catalyst 300 is greater than or equal to an A/F enrichment request reference value set in advance. If there is no A/F enrichment request (the step S205: NO), i.e. if the oxygen storage amount OSA of the S/C catalyst 300 is less than the A/F enrichment request reference value, the process is returned to the step S201.

Incidentally, here, the presence or absence of A/F enrichment request is judged on the basis of the oxygen storage amount OSA so as to treat with a case where the oxygen storage amount OSA of the S/C catalyst 300 is not deviated from the appropriate range or a case where the degree of the deviation is not large (to put it differently, a case where the oxygen storage amount OSA converges within the appropriate range quickly even if the A/F enrichment is not performed), such as, for example, a case where the F/C is ended in an extremely short time; however, the recovery request and the A/F enrichment request may be treated equivalently. In other words, the recovery process may be performed always with the A/F enrichment.

If there is the A/F enrichment request (the step S205: YES), the ECU 100 selects the CNG as the fuel used and controls the fuel injection amount of the CNG such that the exhaust air-fuel ratio AF is AFr, thereby performing the A/F enrichment (step S206).

If the A/F enrichment with the CNG is started, the ECU 100 judges whether or not the oxygen storage amount OSA, in which the calculation is started in the F/C control described above and which is integrated with a constant period, is less than a reference value OSAth (step S207). The reference value OSAth is an upper limit for defining the appropriate range of the oxygen storage amount described above and is obtained experimentally in advance.

If the oxygen storage amount OSA is greater than or equal to the reference value (the step S207: NO), the ECU 100 continues the A/F enrichment with the CNG. On the other hand, if the oxygen storage amount OSA is less than the reference value (the step S207: YES), i.e. the oxygen storage amount OSA of the S/C catalyst 300 converges within the appropriate range, the ECU 100 ends the A/F enrichment (step S208). If the A/F enrichment is ended, the supply of the fuel is controlled in accordance with the normal fuel supply control described above. Moreover, at this time, an integrated value of the oxygen storage amount OSA is also reset to an initial value, and the process is returned to the step S201.

Figure 4:
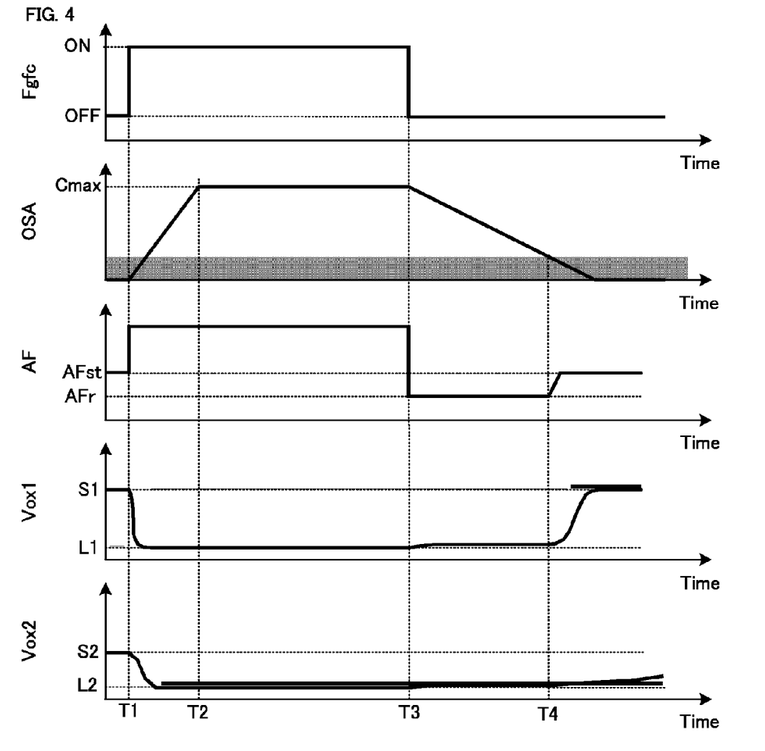
FIG. 4 is a timing chart exemplifying one time transition of states of an engine in a period in which the F/C control and the F/C recovery control are performed.

Next, with reference to FIG. 4, an explanation will be given to a time transition of states of the engine 200 in a period in which the recovery process accompanied by the execution of the F/C and the A/F enrichment is performed. FIG. 4 is a timing chart exemplifying one time transition of the states of the engine 200 in the period in which the F/C control and the F/C recovery control are performed.

In FIG. 4, from the top in order, respective time transitions are exemplified for a F/C flag Fgfc, the oxygen storage amount OSA, the exhaust air-fuel ratio AF, the pre-sensor output voltage Vox1, and the post-sensor output voltage Vox2.

The F/C flag Fgfc is a flag set to be an ON value if the F/C condition is satisfied in the F/C control and the F/C recovery control and set to be an OFF value if the recovery request is made. If the F/C flag Fgfc is set by the ECU 100, as occasion demands.

It is assumed that the F/C flag Fgfc changes from the OFF value to the ON value at a time point T1. In this case, the oxygen storage amount OSA starts to increase from the time point T1 and reaches a maximum oxygen storage amount Cmax, which is the maximum value of the oxygen storage amount of the S/C catalyst 300, at a time point T2. If reaching the maximum oxygen storage amount Cmax, the oxygen storage amount OSA does not further increase.

At this time, the exhaust air-fuel ratio AF changes from the stoichiometric air-fuel ratio AFs to the lean side (a side having a larger value) at the time point T1. Moreover, at the time point T1, the pre-sensor output voltage Vox1 decreases sharply from S1 corresponding to the stoichiometric air-fuel ratio to L1 which is a corresponding value at the F/C. In the same manner, at the time point T1, the post-sensor output voltage Vox2 decreases sharply from S2 corresponding to the stoichiometric air-fuel ratio to L2 which is a corresponding value at the F/C. Incidentally, the pre-sensor output voltage Vox1 and the post-sensor output voltage Vox2 have different values because the latter is located on the downstream side of the U/F catalyst 400 which functions as a buffer element and which has a relatively large capacity.

On the other hand, it is assumed that the recovery request to recover from the F/C is made at a time point T3. In FIG. 4, the oxygen storage amount OSA at this time point is the maximum oxygen storage amount Cmax. Thus, it is considered that there is the A/F enrichment request and the exhaust air-fuel ratio (a controlled air-fuel ratio) AF is controlled to the rich air-fuel ratio AFr described above. As a result, the oxygen storage amount OSA starts to decrease from the maximum oxygen storage amount Cmax and converges within the appropriate range hatching-displayed in the drawing at a time point T4. If the oxygen storage amount OSA has a value in the appropriate range, the recovery control is ended, and the exhaust air-fuel ratio AF is maintained again near the stoichiometric air-fuel ratio AFst.

Incidentally, at the time point T4, both the pre-sensor output voltage Vox1 and the post-sensor output voltage Vox2 indicate lean corresponding values.

Here, the purification ability of emission (NOx, THC, CO, and $H_2$) in the engine system 10 at the time of recovery from the F/C (i.e. at the time of execution) is very high as long as the U/F catalyst 400 is in a lean state (i.e. as long as the oxygen storage amount of the U/F catalyst 400 is beyond the appropriate range), which has been experimentally confirmed.

Therefore, the S/C catalyst 300 and the U/F catalyst 400 can preferably purify the exhaust air containing more unburned fuel than that under the stoichiometric air-fuel ratio due to the enrichment of the air-fuel ratio, even at the time point T4. Thus, it is possible to make the oxygen storage amount OSA of the S/C catalyst 300 converge within the appropriate range, promptly, by the recovery process accompanied by the air-fuel ratio enrichment.

By the way, the recovery process accompanied by the A/F enrichment is desirably ended as promptly as possible from the viewpoint of fuel efficiency. Thus, the ECU 100 suppresses the deterioration of fuel efficiency in the engine system 10 by selecting the CNG as fuel associated with the A/F enrichment.

Figure 5:
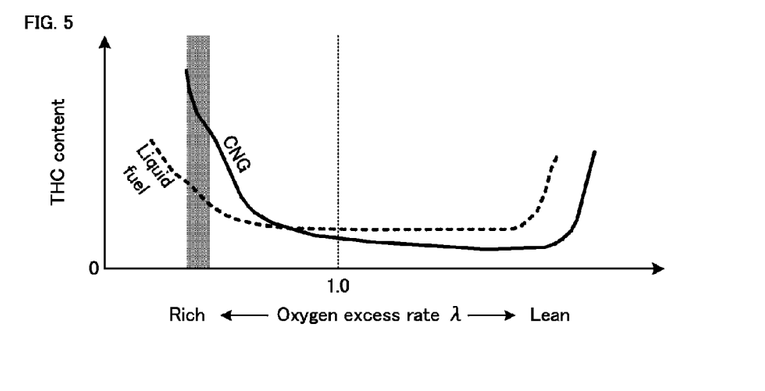
FIG. 5 is a view showing characteristics of a THC content with respect to an oxygen excess ratio in CNG and liquid fuel.

Now, with reference to FIG. 5, an effect due to the selection of the CNG will be explained. FIG. 5 is a view showing characteristics of a THC content with respect to an oxygen excess ratio in the CNG and the liquid fuel.

In FIG. 5, the characteristics of the THC content in the exhaust air (incidentally, the stoichiometric air-fuel ratio corresponds to $\lambda=1$) in a case where an oxygen excess ratio $\lambda$ is plotted on the horizontal axis are shown by the solid line for the CNG and by the dashed line for the liquid fuel. Incidentally, an area in which the oxygen excess ratio $\lambda$ is less than 1 corresponds to the rich air-fuel ratio, and an area in which the oxygen excess ratio $\lambda$ is greater than or equal to 1 corresponds to a lean air-fuel ratio.

If a range of the controlled air-fuel ratio in the A/F enrichment (i.e. the rich air-fuel ratio AFr) is shown as an illustrated hatching area, as shown by the drawing, the THC content of the CNG is greater than that of the liquid fuel. In other words, if the CNG and the liquid fuel have the same output characteristics of the engine 20, the CNG has more THC in the exhaust air. Therefore, a time required for the oxygen storage amount OSA of the S/C catalyst 300 to converge within the appropriate range is shorter in a case where the CNG is selected as fuel than that in a case where the liquid fuel is selected.

In the embodiment, this point is used, and if there is the A/F enrichment request in the F/C recovery control, the A/F enrichment is performed using the CNG as the fuel used, by which it is possible to reduce a period in which the A/F enrichment is performed and to suppress the deterioration of fuel efficiency in the engine system 10.

Second Embodiment

Figure 6:
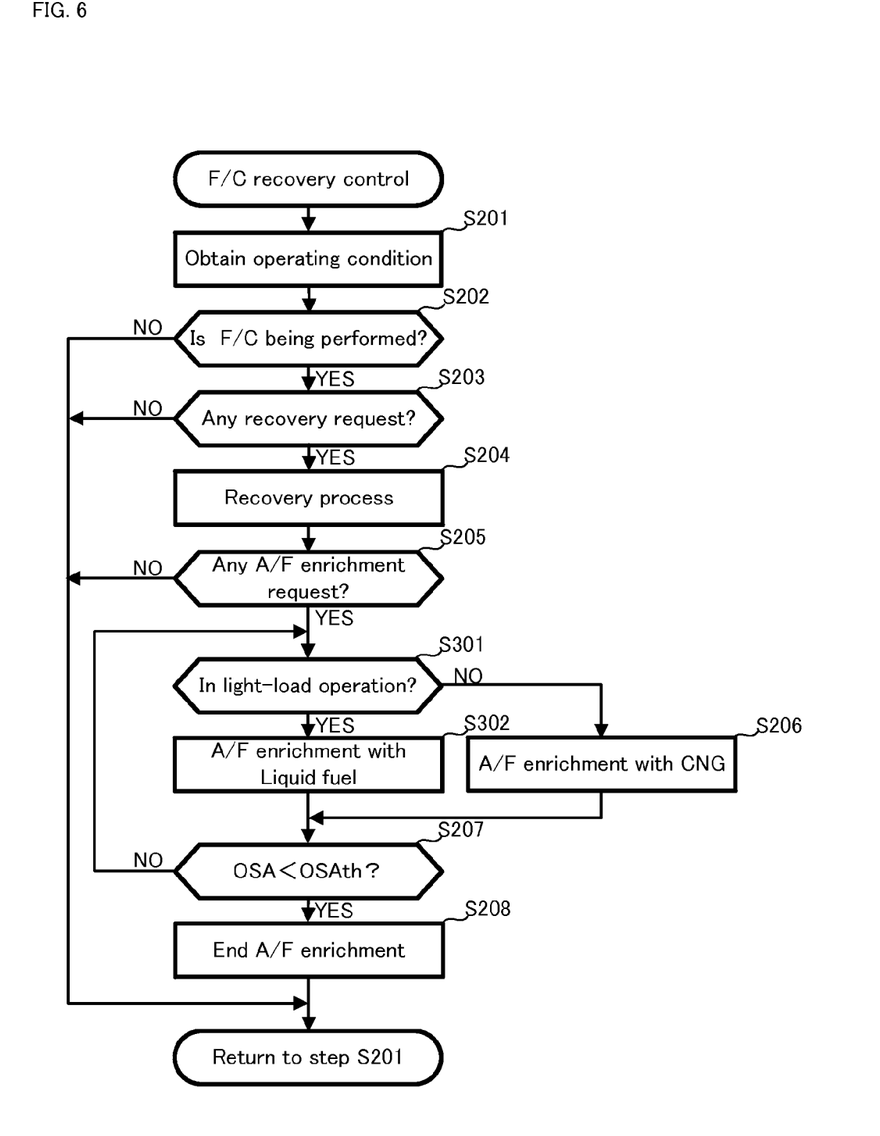
FIG. 6 is a flowchart showing F/C recovery control in a second embodiment of the present invention.

The aspect of the F/C recovery control is not limited to that in the first embodiment. Now, with reference to FIG. 6, F/C recovery control in a second embodiment of the present invention will be explained. FIG. 6 is a flowchart showing the F/C recovery control in the second embodiment. Incidentally, in FIG. 6, portions overlapping those of FIG. 3 will carry the same reference numerals, and the explanation thereof will be omitted as occasion demands.

In FIG. 6, if there is the A/F enrichment request (the step S205: NO), the ECU 100 judges whether or not the engine 200 is in light-load operation (step S301). Incidentally, the step S301 is one example of the operations of the second specifying device of the present invention, indicating that a combustion condition of the fuel is specified. In other words, in the second embodiment, the ECU 100 is configured to operate as one example of the "second specifying device" of the present invention.

The ECU 100 calculates a load factor KL of the engine 200 on the basis of the intake air amount Ga detected by the airflow sensor 11 when performing the judgment process. The load factor KL is defined as a ratio of the intake air at that time point with respect to a maximum intake air of the cylinder 202, and the maximum value is 1.

Incidentally, as a method of calculating the load factor KL, various known methods can be adopted. The ECU 100 compares the calculated load factor KL with a reference value, and if it is less than the reference value, the ECU 100 judges that the engine 200 is in light-load operation. If the engine 200 is not in light-load operation (the step S301: NO), the ECU 100 performs the A/F enrichment with the CNG, as in the first embodiment (the step S206).

On the other hand, if the engine 200 is in light-load operation (the step S301: YES), the ECU 100 does not use the CNG as the fuel associated with the A/F enrichment and performs the A/F enrichment with the liquid fuel (step S302). The other steps are the same as those in the first embodiment.

Incidentally, the step S302 is one example of the operations of the second controlling device of the present invention, indicating that "the second controlling device increases a ratio of the first fuel in the supplied fuel if the specified combustion condition corresponds to a predetermined combustion-deteriorating condition", and particularly corresponds to a case where the entire supplied fuel is replaced by the first fuel (liquid fuel).

Figure 7:
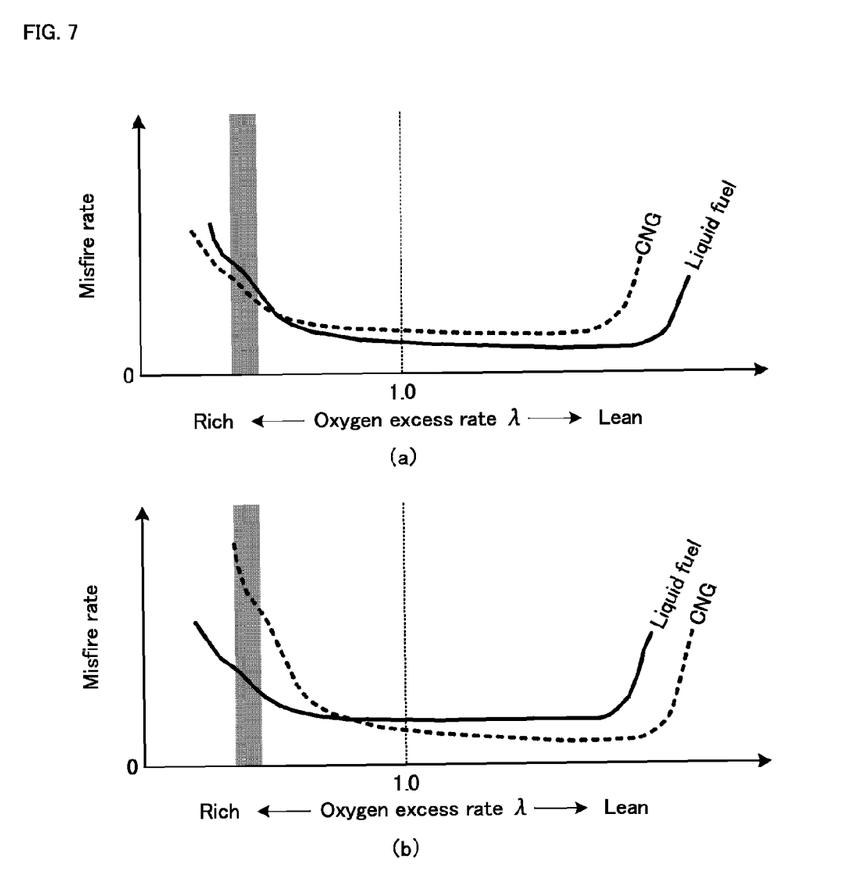
FIG. 7 are views showing characteristics of a misfire rate of the engine with respect to the oxygen excess ratio in the case of use of the CNG and the liquid fuel.

Now, with reference to FIG. 7, an effect in the second embodiment will be explained. FIG. 7 are views showing characteristics of a misfire rate of the engine 200 with respect to the oxygen excess ratio in the case of use of the CNG and the liquid fuel.

In FIG. 7, FIG. 7(a) shows the characteristics in high-load operation, and FIG. 7(b) shows the characteristics in light-load operation. Moreover, the misfire rate defined on the vertical axis means the rate of a cylinder which misfires out of the cylinders which enter the combustion stroke in a predetermined period. However, the definition of the misfire rate is not limited to this.

As is clear from FIG. 7(a), if the engine 200 is in high-load operation, the misfire rate of the CNG (refer to the dashed line) and the misfire rate of the liquid fuel (refer to the solid line) are not significantly different at the oxygen excess ratio $\lambda$ hatching-displayed in the drawing corresponding to the rich air-fuel ratio AFr. On the other hand, as is clear from FIG. 7(b), if the engine 200 is in light-load operation, the misfire rate of the CNG is significantly greater than the misfire rate of the liquid fuel.

This is firstly due to a difference in storage aspects between the CNG and the liquid fuel. In other words, since the CNG is gaseous fuel stored in the gaseous state, the CNG is already a gas in a state injected from the CNG injector 208. Thus, the CNG has a poor mixing property with the intake air which is also a gas, and the air-fuel mixture in the cylinder tends to be heterogeneous. Thus, even if there is no problem in high-load operation in which oxygen is sufficiently present, the low combustibility actualizes an increase in the misfired rate in light-load operation.

Moreover, secondly, it is due to a difference in ignition temperature between the CNG and the liquid fuel. In other words, the liquid fuel, for example, gasoline (E0 fuel) has an ignition temperature of about 210 to 310 degrees C., whereas the CNG has an ignition temperature of about 540 degrees C., which is higher. Thus, in light-load operation in which an in-cylinder temperature tends to be lower than that in high-load operation, the misfire tends to occur.

On the other hand, the liquid fuel is injected in the form of a mist from the liquid fuel injector 209, and gasification is accelerated when the liquid fuel is sucked into the cylinder from the intake port. Thus, in comparison with the CNG as the gaseous fuel, the air-fuel mixture obtained with the intake air tends to be homogeneous. Therefore, the combustibility is hardly influenced by a load state and is appropriate as fuel injected in light-load operation.

As described above, according to the second embodiment, in performing the A/F enrichment with the CNG in order to suppress the deterioration of fuel efficiency, it is possible to prevent a variation in in-cylinder pressure, a reduction in power performance, deterioration of emission, or the like due to the misfire.

In other words, by using the CNG as the fuel associated with the A/F enrichment only in the operating condition that can be used without any problem in practice, it is possible to receive benefits associated with the suppression of the deterioration of fuel efficiency without actualizing another problem.

Incidentally, in the embodiment, the fuel is changed to the liquid fuel in light-load operation; however, this is merely one example, and for example, one portion of the CNG may be replaced by the liquid fuel in a range in which a problem due to combustion deterioration is not actualized. Moreover, at this time, their supply ratio may be changed gradually or continuously in accordance with the combustion state of the engine 200 at that time point. In this manner, the effect associated with the suppression of the deterioration of fuel efficiency by the CNG can be maintained as much as possible, which is practically useful.

Third Embodiment

In the recovery control in the second embodiment, if the engine 200 is in light-load operation, the CNG cannot be used as the fuel associated with the recovery process, and thus, it is not possible to obtain the effect of the suppression of the deterioration of fuel efficiency by the use of the CNG.

Figure 8:
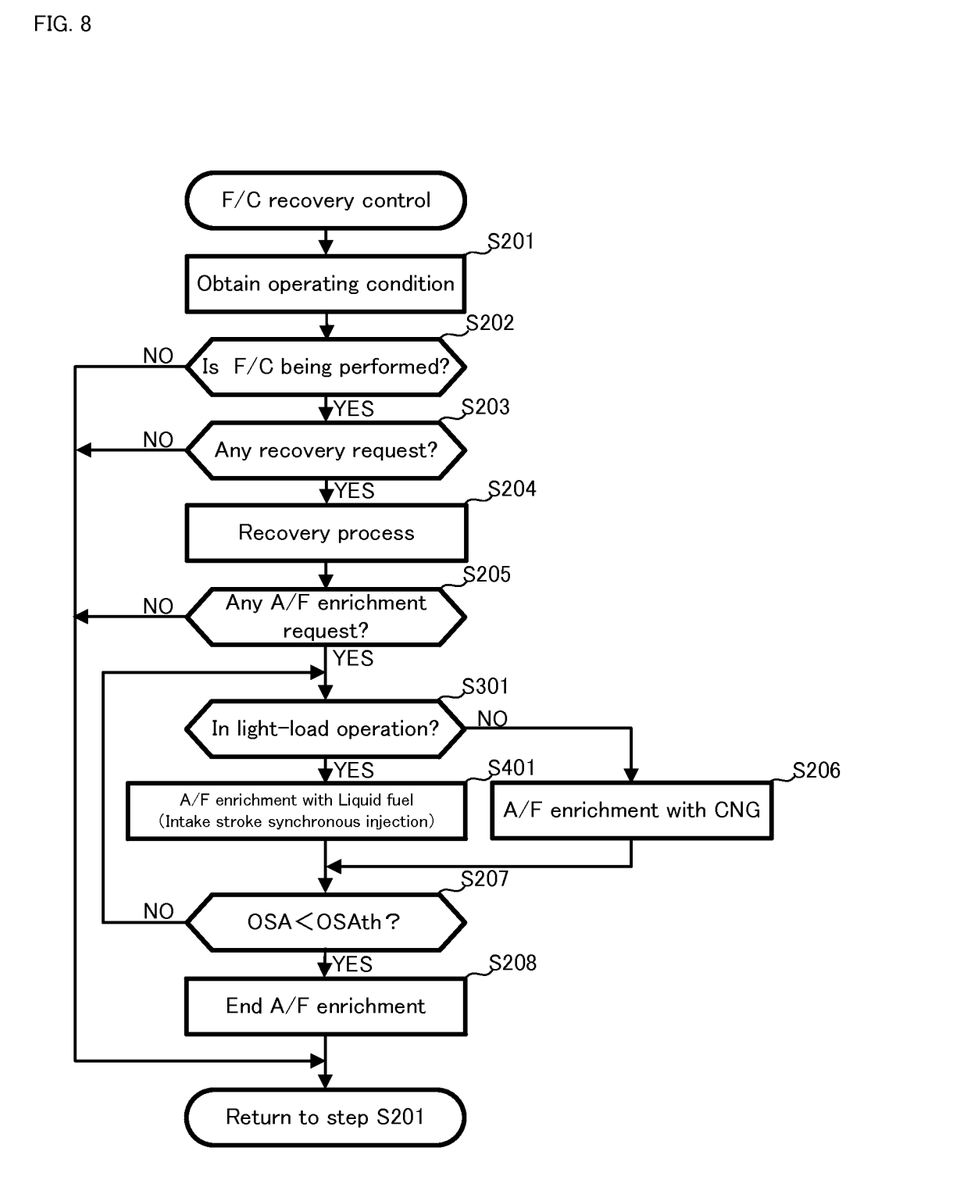
FIG. 8 is a flowchart showing F/C recovery control in a third embodiment of the present invention.

Now, with reference to FIG. 8, an explanation will be given to F/C recovery control in a third embodiment of the present invention which can solve such a problem. FIG. 8 is a flowchart showing the F/C recovery control in the third embodiment. Incidentally, in FIG. 8, portions overlapping those of FIG. 6 will carry the same reference numerals, and the explanation thereof will be omitted as occasion demands.

In FIG. 8, if the engine 200 is in light-load operation at a start time point of the recovery process (the step S301: YES), the ECU 100 performs the recovery control with the liquid fuel, as in the second embodiment; however, the liquid fuel is injected not by normal exhaust stroke synchronous injection but by intake stroke synchronous injection (step S401).

Here, the intake stroke synchronous injection means that at least one portion of the fuel is injected at the time of valve opening of the intake valve, i.e. in an intake stroke. In the liquid fuel injected in the intake stroke, the progression of atomization is slower than that in a case where the liquid fuel is injected at the time of valve closing of the intake valve (the exhaust stroke). Thus, the air-fuel mixture has poorer homogeneity.

Such a reduction in the homogeneity hardly becomes advantageous in the normal injection control but becomes useful in the F/C recovery control. In other words, the deterioration combustion caused by the reduction in the homogeneity of the air-fuel mixture has an effect to increase the reducing agent in the exhaust air and can reduce the period in which the A/F enrichment is performed.

As described above, according to the third embodiment, from the viewpoint of preventing the occurrence of problems caused by various combustion deteriorations, such as a misfire due to the combustion deterioration, a reduction in combustion pressure, or a reduction in combustion efficiency, even if there is no choice but to use the liquid fuel in which amount of the reducing agent under an A/F rich condition is less than that in the CNG, it is possible to suppress the deterioration of fuel efficiency as much as possible.

The present invention is not limited to the aforementioned embodiments, but various changes may be made, if desired, without departing from the essence or spirit of the invention which can be read from the claims and the entire specification. A fuel control apparatus for an internal combustion engine, which involves such changes, is also intended to be within the technical scope of the present invention.

INDUSTRIAL APPLICABILITY

The present invention can be applied to control a fuel supply state at the time of fuel cut control in an internal combustion engine capable of using the plurality of fuels.

DESCRIPTION OF REFERENCE CODES 10 engine system
11 airflow sensor
12 air-fuel ratio sensor
100 ECU
200 engine
208 CNG injector
209 liquid fuel injector
300 S/C catalyst
400 U/F catalyst

The invention claimed is:

1. A fuel control apparatus for an internal combustion engine in a vehicle, the vehicle comprising: the internal combustion engine comprising a fuel supply apparatus capable of supplying, as fuel, first fuel and second fuel in which amount of a reducing agent in an exhaust air under an rich air-fuel ratio is greater than that in the first fuel; and an exhaust purification apparatus disposed in an exhaust passage of the internal combustion engine, said fuel control apparatus comprising:
a first controlling device for controlling the fuel supply apparatus such that the supply of the fuel is temporarily stopped under a predetermined condition; and
a second controlling device for controlling the fuel supply apparatus such that the second fuel is supplied as the fuel and such that an exhaust air-fuel ratio is the rich air-fuel ratio, if the supply of the fuel is restarted from a state in which the supply of the fuel is temporarily stopped, wherein
said fuel control apparatus comprises first specifying device for specifying an oxygen storage amount of the exhaust purification apparatus in a period in which the supply of the fuel is temporarily stopped, and
said second controlling device controls the exhaust air-fuel ratio to be maintained at the rich air-fuel ratio until the specified oxygen storage amount becomes less than a reference value.

2. The fuel control apparatus for the internal combustion engine according to claim 1, wherein
the first fuel has higher combustibility than that of the second fuel,
said fuel control apparatus for the internal combustion engine further comprises a second specifying device for specifying a combustion condition of the fuel in a period in which the exhaust air-fuel ratio is set to be the rich air-fuel ratio by said second controlling device, and
said second controlling device increases a ratio of the first fuel in the supplied fuel if the specified combustion condition corresponds to a predetermined combustion-deteriorating condition.

3. The fuel control apparatus for the internal combustion engine according to claim 2, wherein said second controlling device forbids using the second fuel if the specified combustion condition corresponds to the combustion-deteriorating condition.

4. The fuel control apparatus for the internal combustion engine according to claim 2, wherein said second controlling device controls the first fuel to be supplied in synchronization with an intake stroke of the internal combustion engine if the first fuel is liquid fuel and if the fuel supply apparatus supplies the first fuel to an intake passage of the internal combustion engine.

5. The fuel control apparatus for the internal combustion engine according to claim 1, wherein the first fuel is liquid fuel and the second fuel is CNG.

* * * * *